(12) United States Patent
Chan (10) Patent No.: US 11,541,923 B2
(45) Date of Patent: Jan. 3, 2023

(54) WHEEL-AT-REST AUTOMATIC BRAKE STRUCTURE

(71) Applicant: YUAN YOANG INDUSTRIAL CO., LTD., Taoyuan (TW)

(72) Inventor: Chien-Tsan Chan, Taoyuan (TW)

(73) Assignee: YUAN YOANG INDUSTRIAL CO., LTD., Taoyuan (TW)

( * ) Notice: Subject to any disclaimer, the term of this patent is extended or adjusted under 35 U.S.C. 154(b) by 267 days.

(21) Appl. No.: 17/069,885

(22) Filed: Oct. 14, 2020

(65) Prior Publication Data

US 2022/0111881 A1 Apr. 14, 2022

(51) Int. Cl.
| | |
|---|---|
| *F16D 59/02* | (2006.01) |
| *F16D 49/00* | (2006.01) |
| *B62B 5/04* | (2006.01) |
| *B60T 1/06* | (2006.01) |
| *A61G 5/10* | (2006.01) |
| *F16D 125/46* | (2012.01) |
| *F16D 121/16* | (2012.01) |

(52) U.S. Cl.
CPC ............... *B62B 5/048* (2013.01); *B60T 1/06* (2013.01); *B62B 5/0404* (2013.01); *F16D 49/00* (2013.01); *F16D 59/02* (2013.01); *A61G 5/101* (2013.01); *F16D 2121/16* (2013.01); *F16D 2125/46* (2013.01)

(58) Field of Classification Search
CPC .......... F16D 65/08; F16D 65/09; F16D 59/02; F16D 49/00; F16D 2121/16; F16D 2125/46; B62B 5/0404; B62B 5/0457; B62B 5/0461; B62B 5/048; B60T 1/02; B60T 1/06; B60T 1/062; B60T 7/12; A61G 5/101; A61G 5/1027
USPC ....... 188/17, 19, 20, 21, 22, 31, 68, 69, 114, 188/343, 75, 76
See application file for complete search history.

(56) References Cited

U.S. PATENT DOCUMENTS

| | | | | |
|---|---|---|---|---|
| 1,385,030 | A | * 7/1921 | Watt ...................... | B60R 25/007 188/31 |
| 1,719,157 | A | * 7/1929 | Wilson .................... | F16D 41/12 192/219.2 |

(Continued)

FOREIGN PATENT DOCUMENTS

| | | | | |
|---|---|---|---|---|
| CN | 110454520 | A * | 11/2019 | ............. F16D 51/56 |
| EP | 220734 | A2 * | 10/1986 | ............. F16D 49/00 |

(Continued)

*Primary Examiner* — Thomas J Williams
(74) *Attorney, Agent, or Firm* — Fei-hung Yang (57) ABSTRACT

A wheel-at-rest automatic brake system including a base, a cam, two reset brackets and an interlocking gear is installed in a wheel hub and connected to a wheel shaft of the wheel hub. The base is installed in the wheel hub and has multiple mounting holes and three first pivot holes; the cam is hinged to the first pivot hole and has a protrusion and two driving portions; the two reset brackets are pivoted to the remaining two first pivot holes; each driving portion has a limit notch; the interlocking gear is fixed to the wheel shaft and engaged to the protrusion; and the two driving portions are situated in the two limit notches to define a locked state. When moving, the interlocking gear drives the protrusion to deflect, and the two driving portions prop the two reset brackets up to define a released state.

8 Claims, 7 Drawing Sheets

(56) References Cited

U.S. PATENT DOCUMENTS

| | | | | |
|---|---|---|---|---|
| 2,981,388 A * | 4/1961 | Peras | ............ | B60T 7/12 |
| | | | | 188/68 |
| 4,157,745 A * | 6/1979 | Nelson | ............ | F16H 63/3416 |
| | | | | 188/69 |
| 6,374,953 B1 * | 4/2002 | Casas | ............ | F16D 49/16 |
| | | | | 187/314 |
| 2014/0060994 A1 * | 3/2014 | Burgardt | ............ | F16H 63/18 |
| | | | | 192/219.6 |
| 2022/0111881 A1 * | 4/2022 | Chan | ............ | A61G 5/1005 |

FOREIGN PATENT DOCUMENTS

| | | | | |
|---|---|---|---|---|
| EP | 0220734 A2 * | 5/1987 | ............ | A61G 5/101 |
| EP | 1279577 A1 * | 1/2003 | ............ | B60T 1/005 |
| GB | 2296299 A * | 6/1996 | ............ | B60T 7/14 |

* cited by examiner

WHEEL-AT-REST AUTOMATIC BRAKE STRUCTURE

BACKGROUND

Technical Field

The present disclosure relates to the technical field of transportation equipment. More particularly, the present disclosure relates to a wheel-at-rest automatic brake system applied to various manpower vehicles such as strollers, carts and wheelchairs, and a design similar to that of a two-way ratchet is used to automatically enter into a brake status when the wheels of the vehicles are stopped, and to automatically release the brake status when the vehicle starts moving again.

Description of Related Art

Various manpower vehicles such as strollers, carts, and wheelchairs are driven and moved by manpower, especially the carts used for manufacturing processes in different industries such as optoelectronic and semiconductor industries must constantly transport semi-finished products such as wafers, glass substrates, semiconductor chips, precision electronic components between different stations, and the cart used for transporting the semi-finished products generally comes with wheels for travelling, and most of these wheels are stopped when the wheels are stationary or maintained at a locked state by a brake device, and the brake device can stop the cart by a friction produced between a brake pad and a wheel hub. However, the brake pad is usually worn out and damaged after a long time of use, so that the braking function is reduced or even lost. Moreover, for semiconductors, optoelectronics, and other similar industries that require a clean room for the manufacture, the particles and debris produced by the friction between the brake pad and the wheel hub are also pollutants which will cause problems to the production.

In addition, most of the brake devices used in these carts are operated manually by users, so that when the cart is stationary and maintained at its locked state, the cart requires a design such as the design of a hand brake of a car, in addition to the original braking function of the cart in order to prevent the cart from moving by touching or colliding the cart accidentally or to prevent the transported products from being damaged and to ensure the locked state when the cart is stationary. In addition, the manpower vehicles such as the strollers or wheelchairs also have the same issues. Particularly, when the manpower vehicles are travelling on a slope or a smooth road, the vehicle may slide down accidently when a user releases his/her hands, and it may cause danger to passengers. The strollers or wheelchairs adopt a design of an automatic brake installed on a side of the wheel and provided for unlocking the wheel by pressing, but most designs have to keep pressing the brake for unlock, and it takes much hand-gripping force to use the cart for a long time. If the brake is not pressed completely or released, the car will be unable to move forward or backward. In summation, the manpower vehicles require a novel design of the automatic brake structure to overcome the problems of the prior art.

In view of the drawbacks of these problems, the discloser of the present disclosure based on years of experience in the related industry to design the wheel-at-rest automatic brake system of the present disclosure and install the system between the wheel hub and the wheel shaft in order to lock the wheel hub to a relative position of the wheel shaft, and a special brake pad structure is provided for different uses to fit applications for different occasions and improve the safety of use significantly.

SUMMARY

In view of the aforementioned drawbacks of the prior art, it is a primary objective of the present disclosure to provide a wheel-at-rest automatic brake system having a combination of a base, a cam, two reset brackets and an interlocking gear installed between a wheel hub and a wheel shaft, so as to lock the wheel hub to a relative position of the wheel shaft, and when stationary, the wheel automatically enters into a locked state, and after being pushed, the wheel is unlocked to define a moving state. The wheels can be moved smoothly regardless of moving forward or backward. In addition, the present disclosure further configures the two reset brackets to be relative to the interlocking gear and each reset bracket has a serrated portion, and the brake pad linking rod set provides many different ways of use to fit the applications of different occasions, and achieve the effect of improving the safety of use significantly.

To achieve the foregoing and other objectives, the present disclosure discloses a wheel-at-rest automatic brake system, installed in a wheel hub, and coupled to a wheel shaft of the wheel hub, comprising: a base, being substantially a disc-shaped structure, fixed in the wheel hub, and having a shaft hole formed at the center thereof and configured to be corresponsive to the wheel hub, and a plurality of mounting holes and three first pivot holes formed around the shaft hole; a cam, having a second pivot hole formed at the center thereof and movably hinged with one of the first pivot holes, a protrusion formed at the outer periphery of the cam and corresponding to a direction of the shaft hole, and two driving portions protruded from two symmetrical positions of the cam respectively; two reset brackets, pivoted into the remaining two first pivot holes respectively to from a pivot end, and a moving end formed at the other ends of the two reset brackets, and the two reset brackets being configured to be relative to each other, so that the two reset brackets can be rotated by using the pivot end as a pivot, and the two reset brackets having a limit notch configured to be corresponsive to the two driving portions; and an interlocking gear, mounted onto the wheel shaft; thereby when the wheel is stationary, the two driving portions fall into the two limit notches respectively to lock the wheel hub, and when the wheel rotates forward or backward, the interlocking gear drives the protrusion of the cam to deflect, so that the two driving portions are separated from the two limit notches to prop up the two reset brackets, so as to set the wheel hub into a released and moving state.

In an embodiment of the present disclosure, the cam has an installation slot formed on a side thereof and configured to be corresponsive to the second pivot hole for installing a top lever, and both ends of the top lever are exposed from the periphery of the cam to form the two driving portions respectively.

In another embodiment of the present disclosure, the wheel-at-rest automatic brake system further comprises a pair of limit blocks, and each of the limit blocks is disposed on an outer side of each of the reset brackets, and each of the limit blocks is L-shaped and provided for pressing and covering each of the reset brackets into each of the limit block. In addition, an elastic component is hooked at moving ends of the two reset brackets, so that the two reset brackets keep clamping the cam, or a pair of elastic components and a pair of positioning blocks are provided, and the two positioning blocks are disposed on outer sides of the two reset brackets respectively for receiving the elastic component therein, so that the other ends of the two elastic components abut against the two reset brackets respectively to keep clamping the cam.

In a further embodiment, the two reset brackets have a serrated portion relative to the interlocking gear, and when stationary, the two serrated portions are engaged with the interlocking gear to increase the locking force, or a pair of brake pad linking rod sets are provided, and a third pivot hole is separately formed on the base on the outer side of the two reset brackets, and each of the brake pad linking rod sets comprises a pillar, a rotating shaft, a volute spring and a brake pad, and the pillar is installed on the rotating shaft, and the rotating shaft is provided for installing the pillar to the third pivot hole, and then the volute spring is sheathed on the rotating shaft, so that an end of the pillar keeps abutting against an outer side of one of the reset brackets, and the other end of the pillar is coupled to the brake pad, so that the brake pad keeps abutting the wheel hub to define a locked state, so as to increase the locking force.

DESCRIPTION OF THE EMBODIMENTS

The accompanying drawings are included to provide a further understanding of the disclosure, and are incorporated in and constitute a part of this specification. The drawings illustrate embodiments of the disclosure and, together with the description, serve to explain the principles of the disclosure.

With reference to FIGS. 1, 2, 3~4, and 5 for an exploded view of a preferred embodiment, a perspective view of a preferred embodiment, and two schematic views of a preferred embodiment at a locked state and a released state, and a schematic view showing the installation of another elastic component in accordance with a preferred embodiment of the present disclosure respectively, a wheel-at-rest automatic brake system 1 of the present disclosure is installed in a wheel hub 2 and a wheel shaft 21 coupled to of the wheel hub 2, and the wheel-at-rest automatic brake system 1 comprises a base 11, a cam 12, two reset brackets 13 and an interlocking gear 14.

Figure 1:
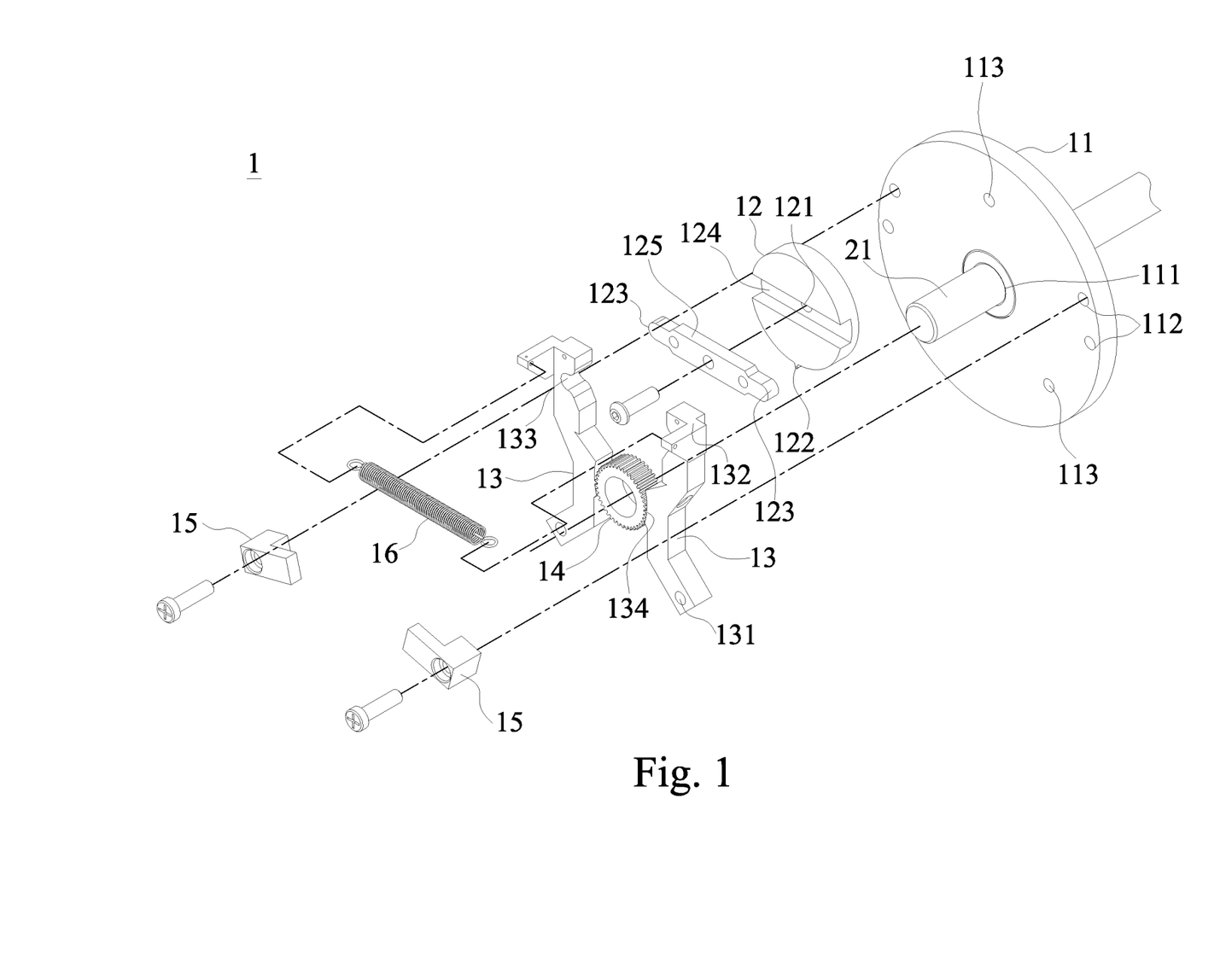
FIG. 1 is an exploded view of a preferred embodiment of this disclosure.
Figure 2:
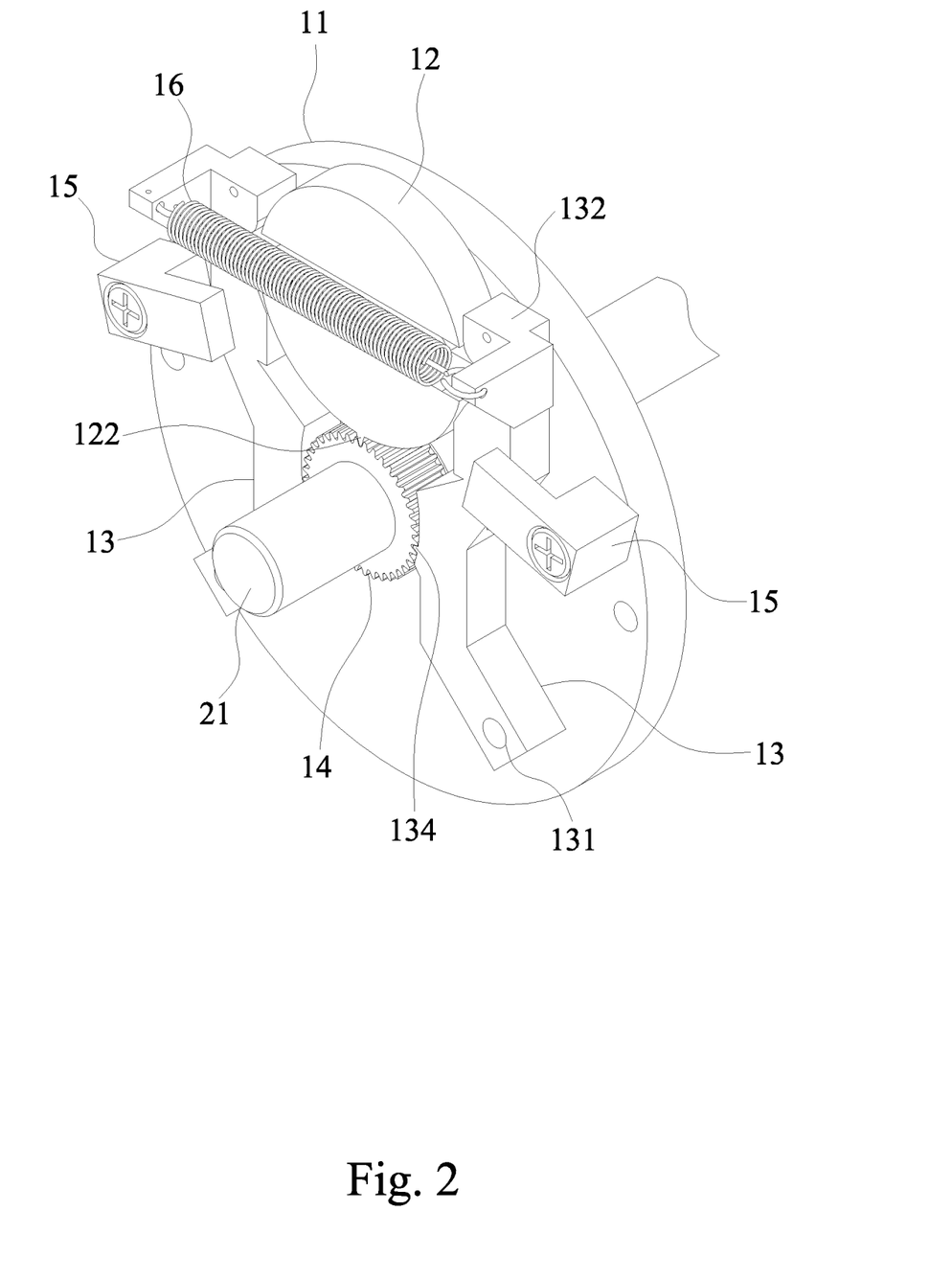
FIG. 2 is a perspective view of an assembled structure in accordance with a preferred embodiment of this disclosure.

The base 11 is substantially a disc-shaped structure fixed in the wheel hub 2, and comprises a shaft hole 111 formed at the center thereof and configured to be corresponsive to the wheel hub 2, and a plurality of mounting holes 112 and three first pivot holes 113 formed around the shaft hole 111.

The cam 12 comprises a second pivot hole 121 formed at the center thereof and movably hinged with one of the first pivot holes 113, a protrusion 122 formed at the outer periphery of the cam 12 and corresponding to a direction of the shaft hole 111, and two driving portions 123 protruded from two symmetrical positions of the cam 12 respectively. It is noteworthy that in this embodiment, the cam 12 has an installation slot 124 formed on a side thereof and configured to be corresponsive to the second pivot hole 121 for installing a top lever 125, and both ends of the top lever 125 are exposed from the periphery of the cam 12 to form the two driving portions 123.

The two reset brackets 13 are pivoted into the remaining two first pivot holes 113 respectively to form a pivot end 131, and a moving end 132 formed at the other end of the two reset brackets 13, and the two reset brackets 13 are configured to be relative to each other, so that the two reset brackets 13 can be rotated by using the pivot end 131 as a pivot, and the two reset brackets 13 have a limit notch 133 configured to be corresponsive to the two driving portions 123. In addition, the two reset brackets 13 have a serrated portion 134 relative to the interlocking gear 14, and when stationary, the two serrated portions 134 are engaged with the interlocking gear 14.

Figure 3:
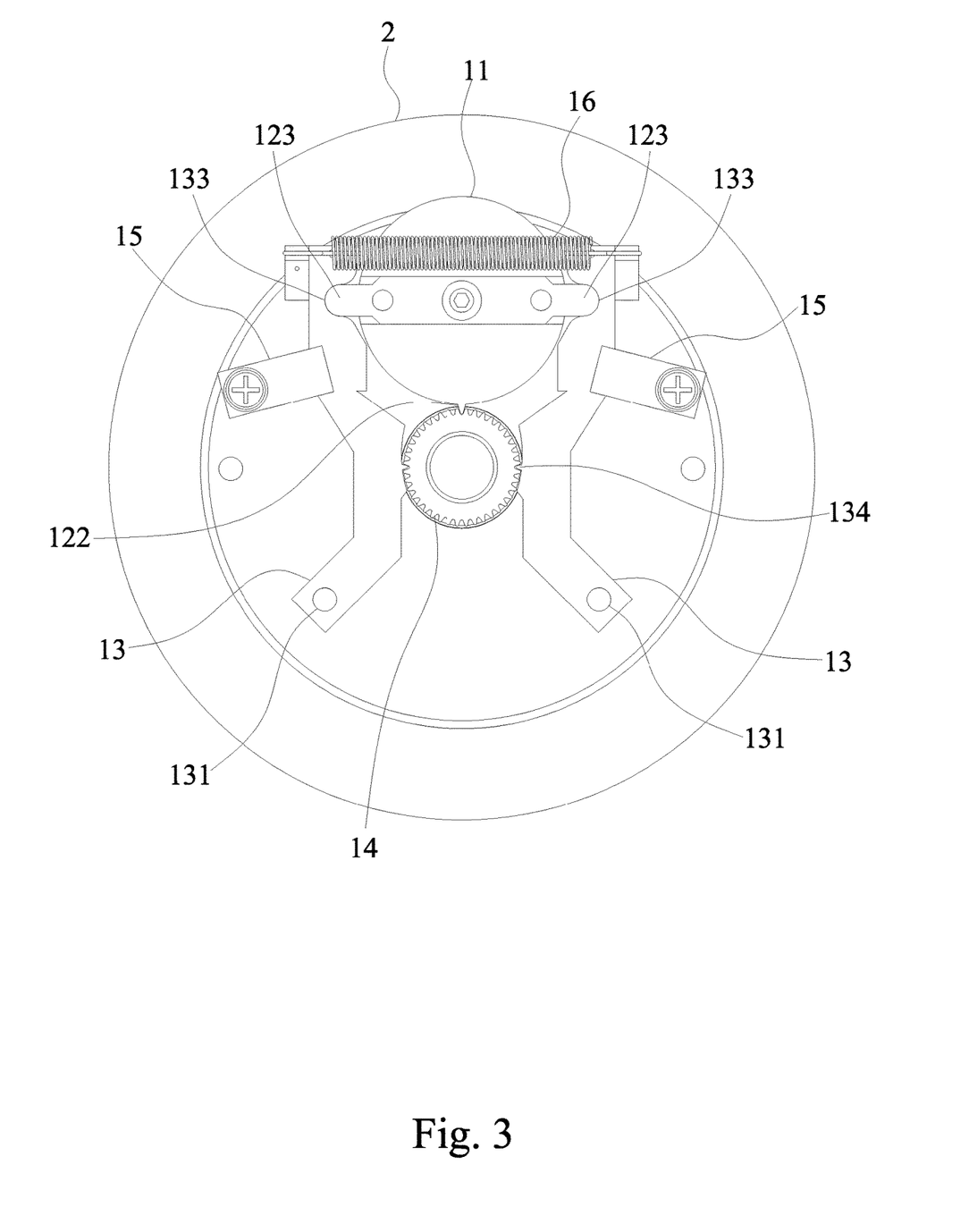
FIG. 3 is a schematic view of an automatic brake structure at a locked status in accordance with a preferred embodiment of this disclosure.
Figure 4:
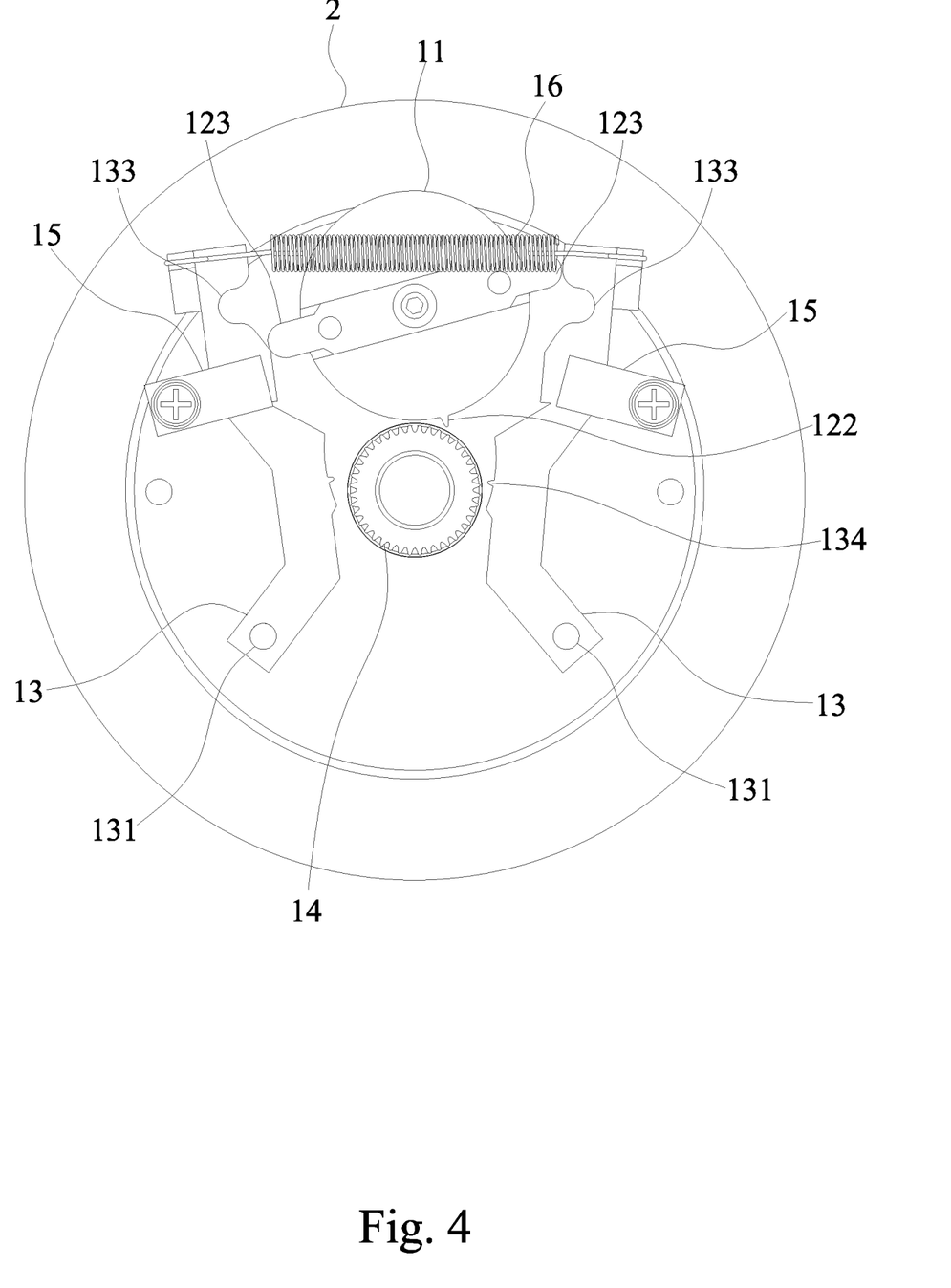
FIG. 4 is a schematic view of an automatic brake structure at a released status in accordance with a preferred embodiment of this disclosure.

The interlocking gear 14 is mounted onto the wheel shaft 21, such that when the wheel is stationary, the two driving portions 123 fall into the two limit notches 133 respectively to lock the wheel hub 2, and when the wheel rotates forward or backward, the interlocking gear 14 drives the protrusion 122 of the cam 12 to deflect, so that the two driving portions 123 are separated from the two limit notches 133 to prop up the two reset brackets 13, so as to set the wheel hub 2 into a released and moving state.

In addition, the wheel-at-rest automatic brake system 1 of the present disclosure further comprises a pair of limit blocks 15, and each of the limit blocks 15 is disposed on an outer side of each of the reset brackets 13, and each of the limit blocks 15 is substantially L-shaped and provided for pressing and covering each of the reset brackets 13 into each of the limit blocks 15.

In addition, the wheel-at-rest automatic brake system 1 of the present disclosure further comprises an elastic component 16 hooked at moving ends of the two reset brackets 13 respectively, so that the two reset brackets 13 keeps clamping the cam 12.

Figure 5:
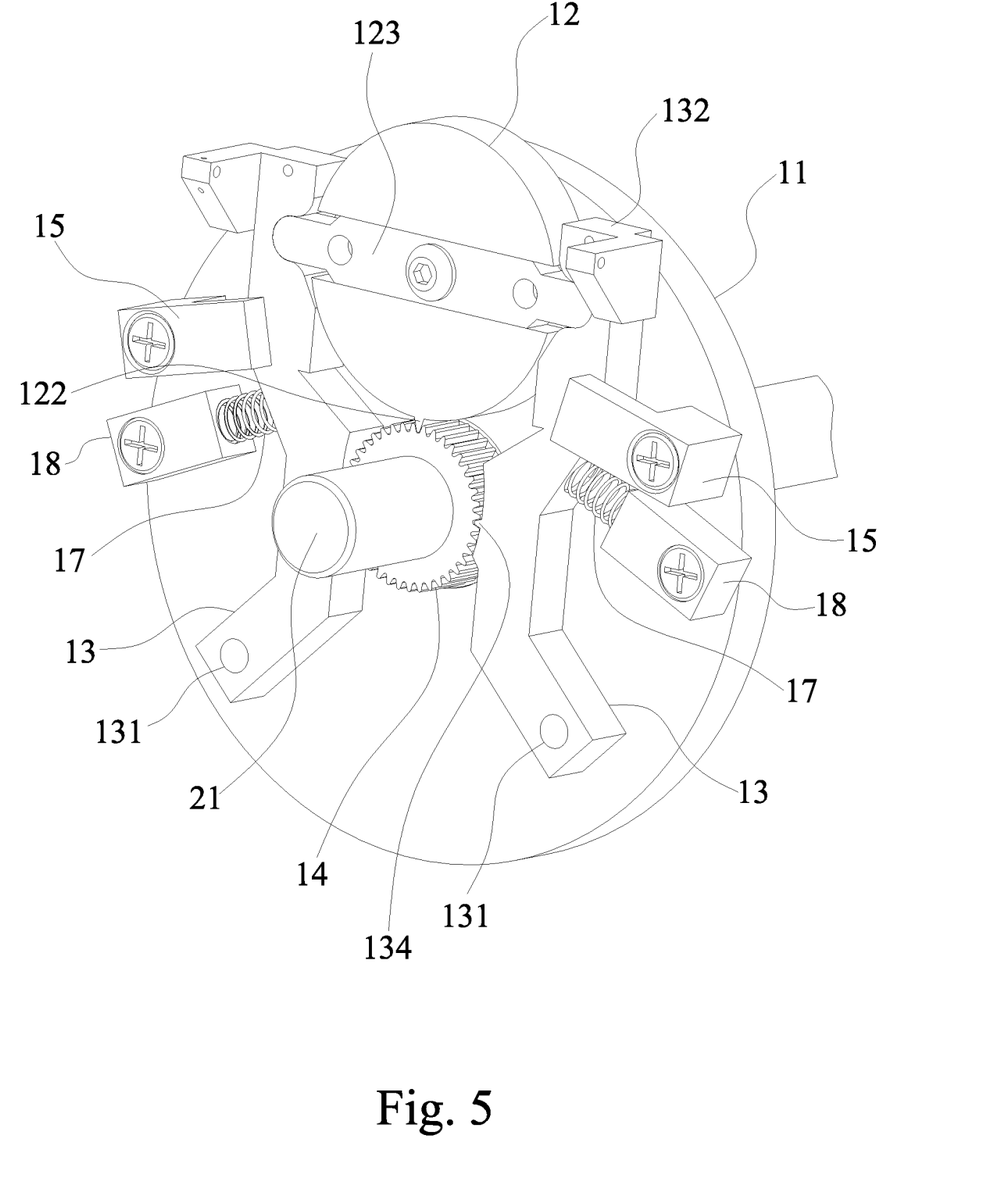
FIG. 5 is a schematic view of another automatic brake structure installed with an elastic component in accordance with a preferred embodiment of the present disclosure.

In FIG. 5, the wheel-at-rest automatic brake system 1 of the present disclosure further comprises a pair of elastic components 17 and a pair of positioning blocks 18, and the two positioning blocks 18 are disposed on outer sides of the two reset brackets 13 for receiving the elastic components 17 therein respectively, and the other ends of the two elastic components 17 abut against the two reset brackets 13 to keep clamping the cam 12.

Figure 6:
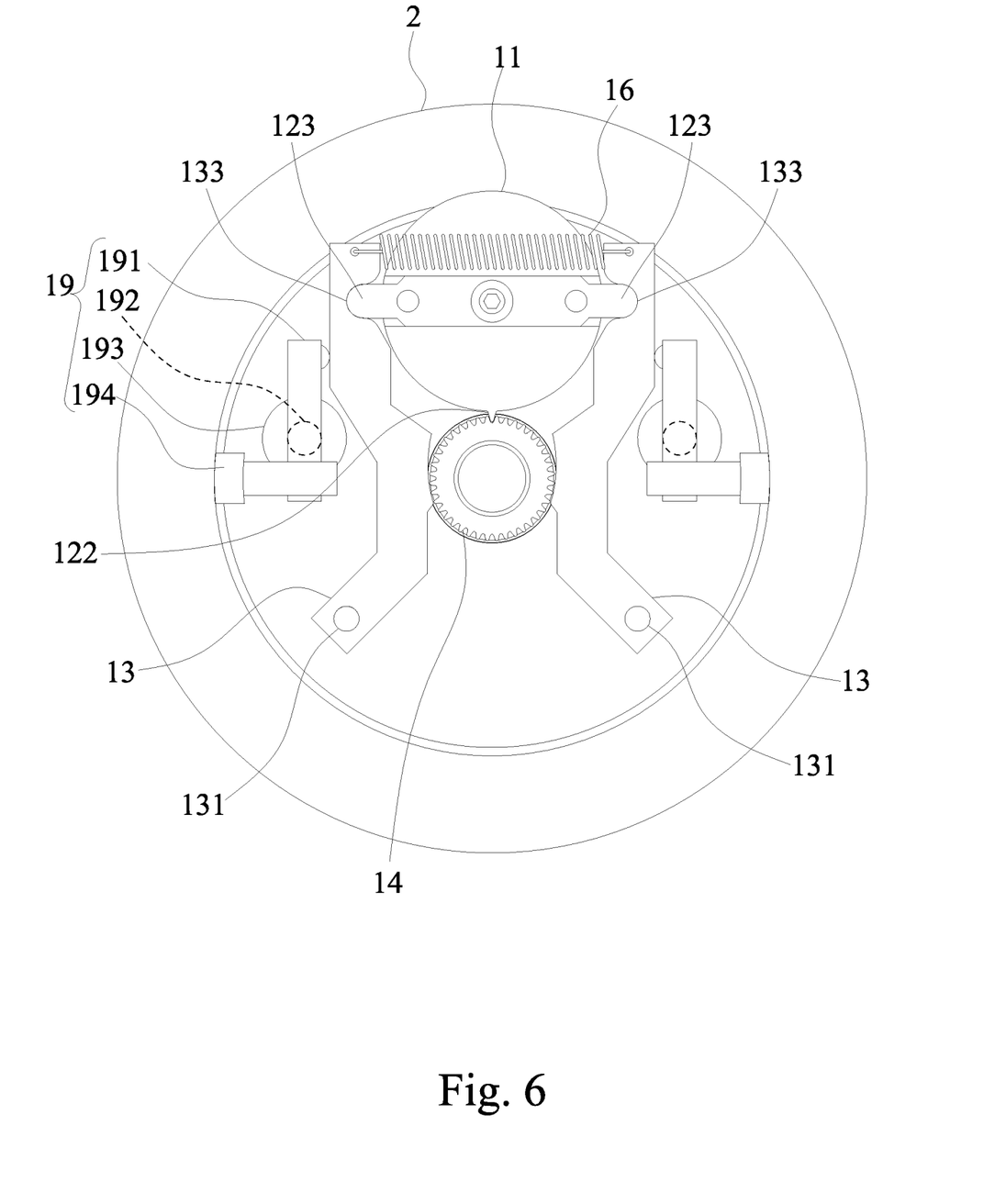
FIG. 6 is a schematic view of an automatic brake structure at a locked status in accordance with another preferred embodiment of the present disclosure.
Figure 7:
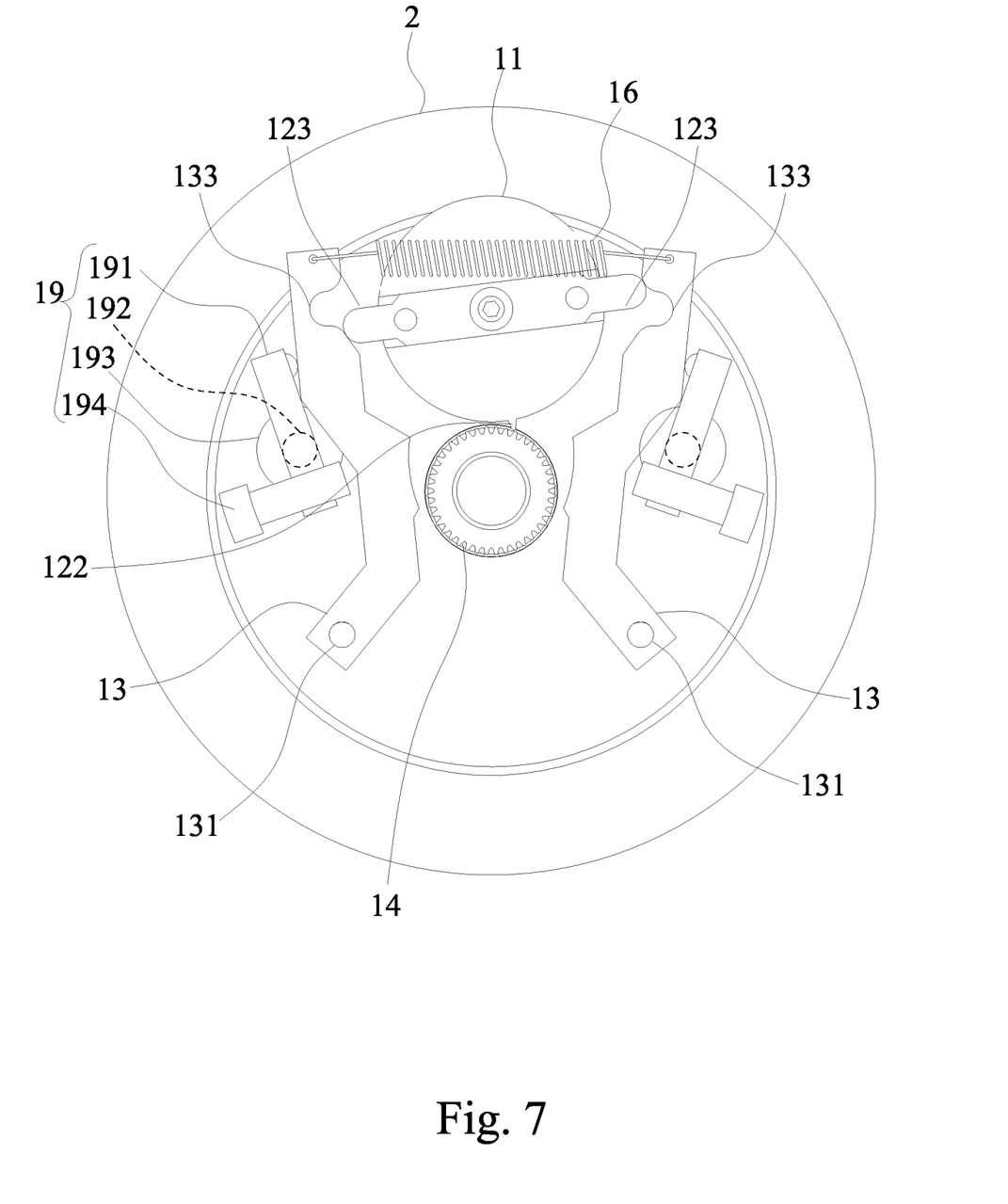
FIG. 7 is a schematic view of an automatic brake structure at a released status in accordance with another preferred embodiment of the present disclosure.

With reference to FIGS. 6 and 7 for the schematic views showing different statuses during the operation of another preferred embodiment of the present disclosure respectively, the wheel-at-rest automatic brake system 1 further comprises a pair of brake pad linking rod sets 19, and a third pivot hole 114 formed on the base 11 on the outer side of the two reset brackets 13, and each of the brake pad linking rod sets 19 comprises a pillar 191, a rotating shaft 192, a volute spring 193 and a brake pad 194, and the pillar 191 is installed on the rotating shaft 192, and the rotating shaft 192 is provided for installing the pillar 191 to the third pivot hole 114, and then the volute spring 193 is sheathed on the rotating shaft 192, so that an end of the pillar 191 keeps abutting the outer side of one of the reset brackets 13, and the other end of the pillar 191 is coupled to the brake pad 194, so that the brake pad 194 keeps abutting the wheel hub 2 to define a locked state.

In the present disclosure, a combination of the base 11, the cam 12, the two reset brackets 13 and the interlocking gear 14 is installed between the wheel hub 2 and the wheel shaft 21 to lock the wheel hub 2 to a relative position of the wheel shaft 21, so that when the wheel is stationary, the locked state is entered automatically, and when the wheel is pushed and unlocked, a moving state is defined. The wheels can be moved smoothly regardless of moving forward or backward. In addition, the present disclosure further configures the two reset brackets 13 to be relative to the interlocking gear 14 and each reset bracket 13 has a serrated portion 134, and the brake pad linking rod set 19 provides many different ways of use to fit the applications of different occasions, and achieve the effects of improving the safety of use significantly.

What is claimed is:

1. A wheel-at-rest automatic brake system, installed in a wheel hub, and coupled to a wheel shaft of the wheel hub, comprising:
    a base, being substantially a disc-shaped structure, fixed in the wheel hub, and having a shaft hole formed at the center thereof and configured to be corresponsive to the wheel hub, and a plurality of mounting holes and three first pivot holes formed around the shaft hole; a cam, having a second pivot hole formed at the center thereof and movably hinged with one of the first pivot holes, a protrusion formed at the outer periphery of the cam and corresponding to a direction of the shaft hole, and two driving portions protruded from two symmetrical positions of the cam respectively;
    two reset brackets, pivoted into the remaining two first pivot holes respectively to form a pivot end, and a moving end formed at the other ends of the two reset brackets, and the two reset brackets being configured to be relative to each other, so that the two reset brackets are rotated by using the pivot end as a pivot, and the two reset brackets having a limit notch respectively configured to be corresponsive to the two driving portions; and
    an interlocking gear, mounted onto the wheel shaft; thereby when the wheel is stationary, the two driving portions fall into the two limit notches respectively to lock the wheel hub, and when the wheel rotates forward or backward, the interlocking gear drives the protrusion of the cam to deflect, so that the two driving portions are separated from the two limit notches to prop up the two reset brackets, so as to set the wheel hub into a released and moving state.

2. The wheel-at-rest automatic brake system as claimed in claim 1, wherein the cam has an installation slot formed on a side thereof and configured to be corresponsive to the second pivot hole for installing a top lever, and both ends of the top lever are exposed from the periphery of the cam to form the two driving portions respectively.

3. The wheel-at-rest automatic brake system as claimed in claim 2, further comprising a pair of limit blocks, and each of the limit blocks being disposed on an outer side of each of the reset brackets, and each of the limit blocks being L-shaped and provided for pressing and covering each of the reset brackets into each of the limit block.

4. The wheel-at-rest automatic brake system as claimed in claim 3, further comprising an elastic component hooked at moving ends of the two reset brackets, so that the two reset brackets keep clamping the cam.

5. The wheel-at-rest automatic brake system as claimed in claim 3, further comprising a pair of elastic components and a pair of positioning blocks, and the two positioning blocks being disposed on outer sides of the two reset brackets respectively for receiving the elastic component therein, so that the other ends of the two elastic components abut against the two reset brackets respectively to keep clamping the cam.

6. The wheel-at-rest automatic brake system as claimed in claim 4, wherein the two reset brackets have a serrated portion respectively relative to the interlocking gear, and when stationary, the two serrated portions are engaged with the interlocking gear.

7. The wheel-at-rest automatic brake system as claimed in claim 5, wherein the two reset brackets have a serrated portion respectively relative to the interlocking gear, and when stationary, the two serrated portions are engaged with the interlocking gear.

8. The wheel-at-rest automatic brake system as claimed in claim 1, further comprising a pair of brake pad linking rod sets, and a third pivot hole separately formed on the base on the outer side of the two reset brackets, each of the brake pad linking rod sets comprising a pillar, a rotating shaft, a volute spring and a brake pad, and the pillar being installed on the rotating shaft, and the rotating shaft being provided for installing the pillar to the third pivot hole, and then the volute spring being sheathed on the rotating shaft, so that an end of the pillar keeps abutting against an outer side of one of the reset brackets, and the other end of the pillar being coupled to the brake pad, so that the brake pad keeps abutting the wheel hub to define a locked state.

* * * * *